UNITED STATES PATENT OFFICE.

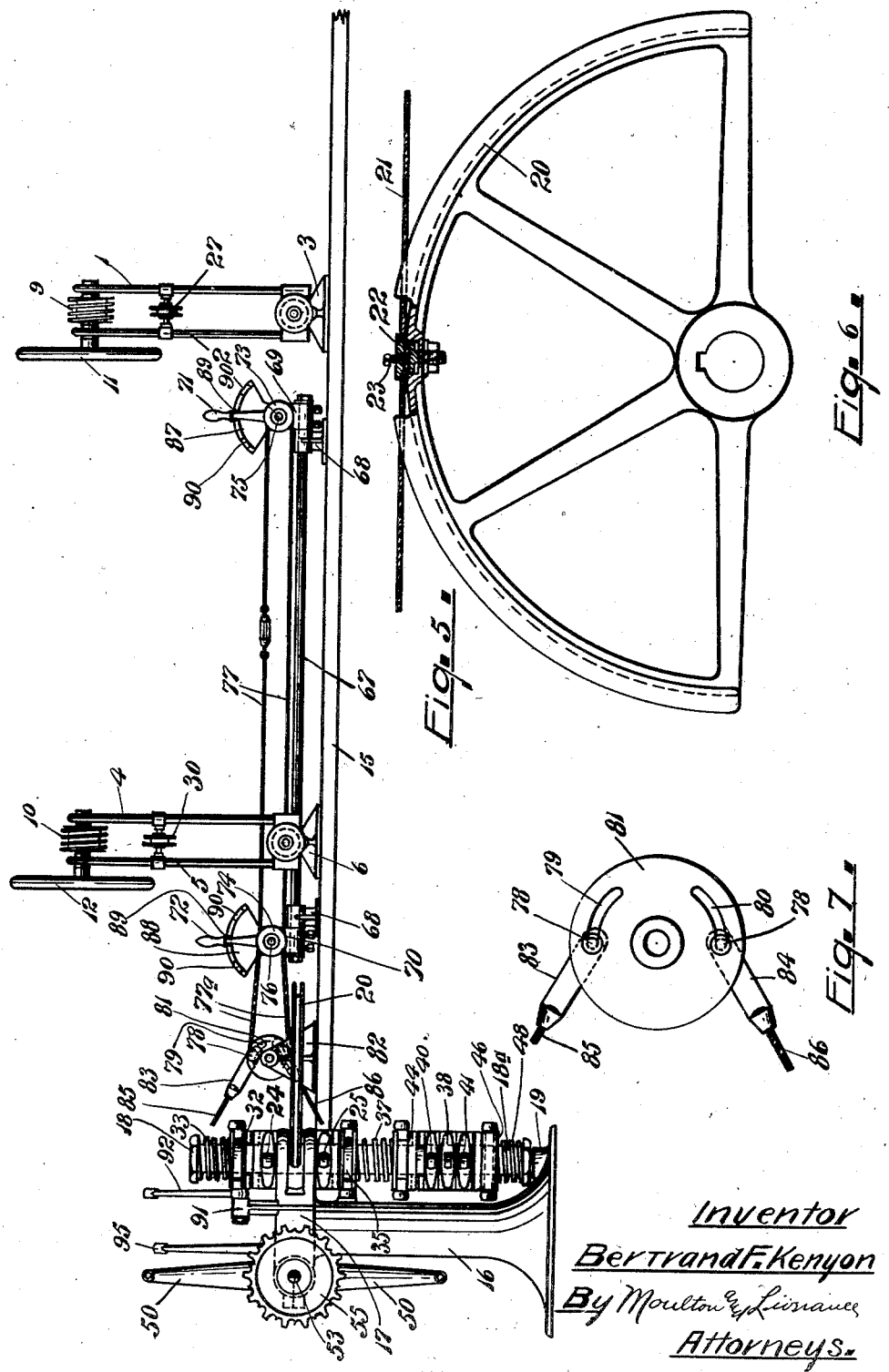

BERTRAND F. KENYON, OF GRAND RAPIDS, MICHIGAN, ASSIGNOR, BY MESNE ASSIGNMENTS, TO GRAND RAPIDS TRUST COMPANY, OF EAST GRAND RAPIDS, MICHIGAN, AS TRUSTEE FOR HERMAN CLARK ANDERSON, EDWARD J. CLARK, AND MARY ELLEN KENYON.

AIRCRAFT CONTROL.

1,332,345.  Specification of Letters Patent.  Patented Mar. 2, 1920.

Application filed January 9, 1918. Serial No. 210,971.

*To all whom it may concern:*

Be it known that I, BERTRAND F. KENYON, a citizen of the United States of America, residing at Grand Rapids, in the county of Kent and State of Michigan, have invented certain new and useful Improvements in Aircraft Control; and I do hereby declare the following to be a full, clear, and exact description of the invention, such as will enable others skilled in the art to which it appertains to make and use the same.

This invention relates to aeroplanes or other similar heavier-than-air air craft, and is particularly concerned with novel improvements in the flying control of machines of this character. A primary object and purpose of the invention resides in the provision of a double control for heavier-than-air air craft whereby two aviators may each have control of the flight thereof, but in which either at will may disconnect himself from the flight governing devices of the aeroplane, or either at will may disconnect the other therefrom so as to render the one disconnected incapable of any operation upon the flight governing devices of the plane. My invention is directed to many novel constructions and arrangements of parts for producing operative mechanism to accomplish this object. This is of particular importance in connection with air craft used in warfare, inasmuch as one of the aviators may be injured and incapable of controlling the aeroplane, while the other may be uninjured and still capable of controlling the aeroplane if the injured one can be disconnected from flight control thereof; while in many instances if he is not disconnected therefrom, the weight of his body falling against the controlling mechanism makes the uninjured aviator helpless to control the flight of the aeroplane, whereupon both, with the machine, fall, resulting frequently in death to both aviators and destruction of the aeroplane. With my invention either aviator is permitted by a very simple operation which can be effected almost instantaneously to free the flight governing devices of the plane entirely from the other aviator. This invention is of particular utility in actual service in warfare doubling the chances that an aeroplane may return to its own lines even though attacked and a pilot thereof injured.

For an understanding of the invention and the many novel mechanisms for attaining the ends defined and others not particularly set out in detail above, all in a relatively simple and practical manner, reference may be had to the accompanying drawings showing a preferred construction of the invention, in which, Figure 1 is a perspective view showing the major portion of the double controlling mechanism.

Fig. 5 is a side elevation of the double controlling mechanism and showing the devices by means of which each aviator may at will either disconnect himself or the other aviator from control of the machine.

Fig. 6 is a plan view, with parts shown in section, illustrating the aileron actuating member, and Fig. 7 is a side elevation of a detail of the controlling mechanism, the use of which will later appear.

Like reference characters refer to like parts in the different views of the drawings.

Figure 1:
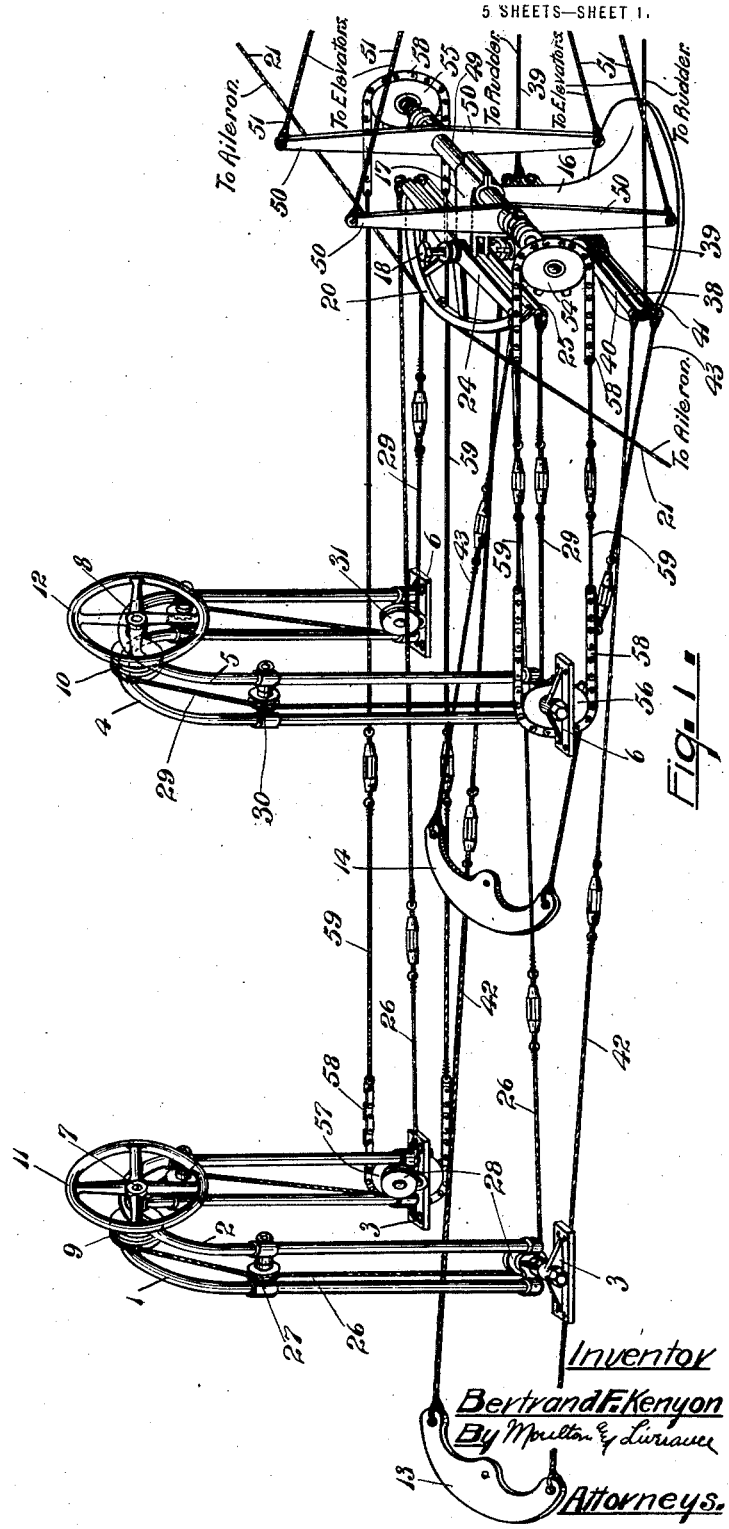
Figure 2:
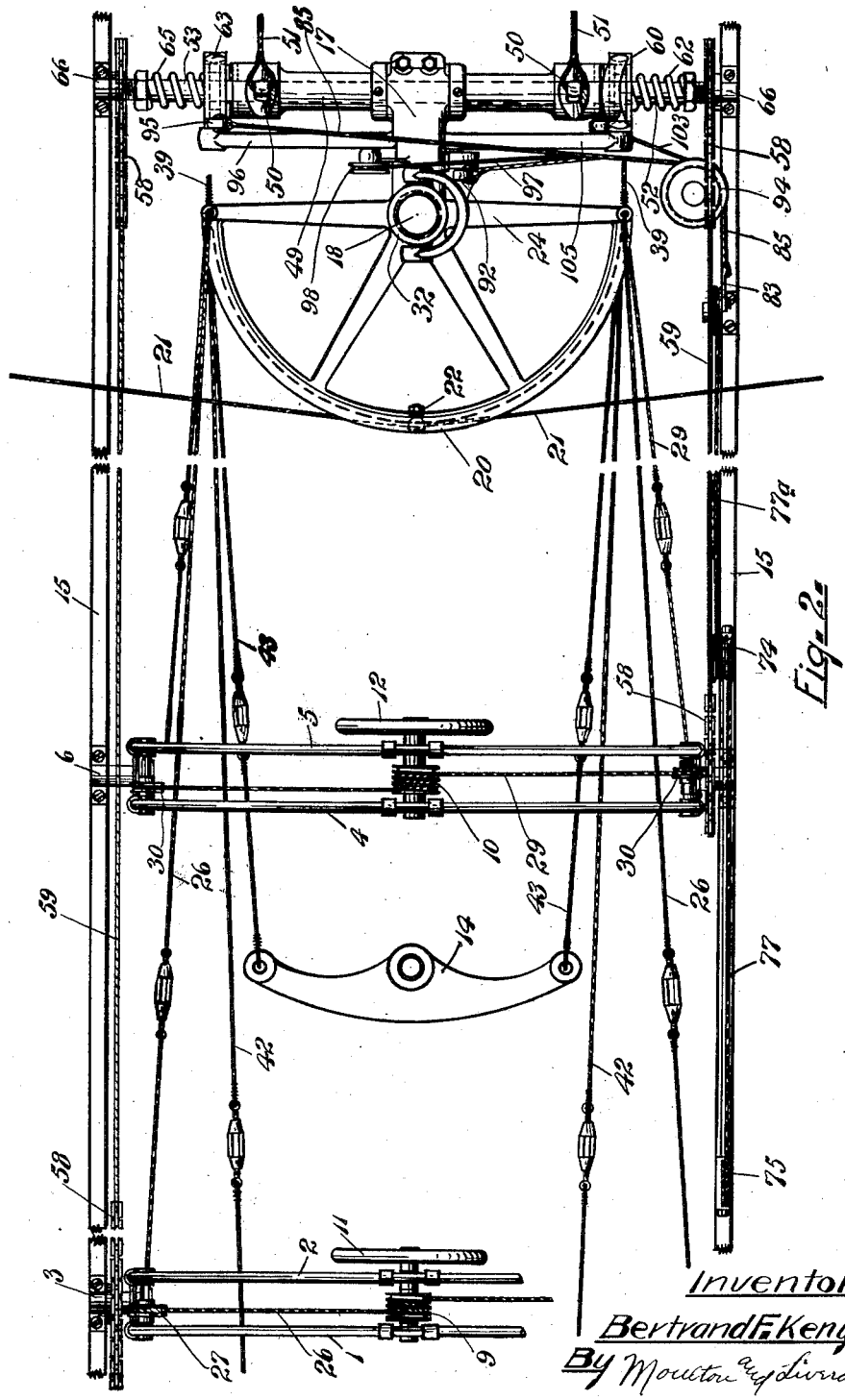
Fig. 2 is a plan view thereof, some parts being broken away on account of lack of space in the drawing.

The construction by means of which my invention is embodied includes a front manually operated controlling element, comprised of two inverted U-shaped rods 1 and 2 which are connected together and at their lower ends are pivotally mounted on brackets 3 to turn about a horizontal axis. This controlling element is mounted in the front cock pit of the fuselage of an aeroplane or hydroplane. Likewise in a rear cock pit a substantially identical controlling element comprised of two inverted U-shaped rods 4 and 5 connected together and pivotally mounted to turn on a horizontal axis in brackets 6 at their lower ends, is provided, to be operated by a pilot seated in the rear cock pit, the front controlling element being operated by a pilot in the front cock pit. Adjacent the upper end of the front controlling element a shaft 7 is mounted and, likewise, a similar shaft 8 is similarly mounted on the rear element, said shafts being rotatable and having helically grooved pulleys 9 and 10 attached, respectively, thereto between the U-shaped rods and at their rear ends carrying operating hand wheels 11 and 12, respectively, as shown. In the front and rear cock pits, respectively, there are also pivotally mounted levers 13 and 14 which are adapted to be turned by the feet of the aviators located in the front and rear compartments. The brackets 3 and 6 are permanently secured to any suitable frame members 5 extending lengthwise of the fuselage.

Directly back of the rear cock pit, and secured in any suitable manner to the fuselage body, is a supporting post 16 terminating at its upper end in a head 17 which on its front side has two forwardly extending parallel and spaced apart ears 17$^a$ through which the upper member 18 of a divided shaft passes, the lower part 18$^a$ of said shaft being received in any suitable bearing 19 cast on the base of the post 16. A semi-circular sector 20 is fixed to the shaft 18 and extends in front thereof, to which a cable 21 is secured, it extending in opposite directions and adapted to be operatively secured to the ailerons or warping planes of the machine. In practice this cable, substantially at its middle point, passes through a sleeve 22 permanently secured to the sector 20, through which a set screw 23 passes to firmly hold the cable in place, yet permit its adjustment if ever necessary.

A lever 24 is loosely mounted on the shaft 18 immediately above the upper ear 17$^a$ it having arms extending outwardly to each side of the post. Similarly, a second lever 25 is loosely mounted on shaft 18 immediately below the lower ear 17$^a$, parallel to the upper lever 24. A cable 26 is wound around the grooved pulley 9 extending in both directions therefrom downwardly and outwardly over idle guide pulleys 27, mounted between the rods 1 and 2, and thence to guide pulleys 28 mounted adjacent the lower ends of said rods to change the direction of the cables so that they may extend to the rear and connect to the opposite ends of the lever 24 as shown. A second cable 29 is wound around the grooved pulley 10 and guided by idle pulleys 30 and 31 so that its ends may connect to the opposite ends of the lever 25. A collar 32 is splined on shaft 18 above the lever 24 and is normally pressed in a downward direction by a coil spring 33. This collar and the upper side of the lever 24 at its central point are formed with coacting clutch faces 34 which, when in engagement, connect the lever 24 to the post 18, as will be evident. A second collar 35 is mounted below the lever 25 its upper face and the lower side of the lever having similar coacting clutch faces 36 adapted to be held in engagement by the coil spring 37.

The lower half 18$^a$ of the divided shaft carries a lever 38 which is fixed to the shaft at a point midway between its ends, cables 39 leading to the rear, one from each end of said lever, and adapted to connect to the aeroplane rudder to govern movements of the same. A lever 40 is located immediately above the lever 38 and loosely mounted on the lower part 18$^a$ of the shaft, while a second lever 41 is loosely mounted on said section 18$^a$ of the shaft directly below the lever 38, all of these levers being of substantially equal length and mounted one over the other, as shown. Cables 42 connect the ends of lever 40 with the front foot operated member 13 and cables 43 connect the ends of lever 41 with the rear foot operated member 14.

A collar 44 is splined on the shaft part 18$^a$ above the lever 40, its lower face and the upper face of said lever at its middle point being formed with coöperating clutch faces 45 normally pressed into engagement by the coil spring 37. A second collar 46 is located below the lower lever 41, its upper face and the lower face of said lever being similarly equipped with coöperating clutch faces 47, normally held in engagement by the coil spring 48.

On a rear extension 17$^b$ to the head 17, a hollow sleeve 49 is rotatably mounted substantially at a point midway between its ends, said sleeve being located horizontal and substantially paralleling the levers 24 and 25. From each end of the sleeve, arms 50 extend upwardly and downwardly, as shown, to the ends of which cables 51 are attached, the same being adapted to connect at the rear of the aeroplane with the elevators therefor. Two shafts 52 and 53 pass into the sleeve 49 from each end thereof and may abut at their inner ends. These shafts extend a distance beyond the ends of the sleeve 49 and have sprocket wheels 54 and 55, respectively, fastened thereon. A sprocket wheel 56 is fastened at the lower end and at one side of the rear U-shaped controlling element, and a sprocket wheel 57 is fastened to the front U-shaped controlling element at its lower end, and at the opposite side, wheels 56 and 57 being mounted so as to turn about the pivotal axes of said controlling elements. Sections of sprocket chains 58 pass around the sprocket wheels 56 and 54, the one side being connected by suitable cables 59, while the sprocket wheels 57 and 55 are likewise operatively connected together by similar sprocket chains and cables 58 and 59.

A collar 60 is splined on the shaft 52 at one end of the sleeve 49, the adjacent faces of said collar and sleeve being formed with interengaging clutch devices 61. Normally a coil spring 62 holds the clutch faces engaged. Likewise a collar 63 is splined on the shaft 53 at the opposite end of sleeve 49, it and said end of the sleeve having cooperating clutch faces 64 normally held in engagement by a coil spring 65. The outer ends of shafts 52 and 53 are supported in suitable bearings 66 attached to the frame members 15.

Two brackets 68 are connected to one of the frame members 15, preferably, the one at the left of the fuselage, in spaced apart relation, being formed with bearings to carry a shaft 67, as shown in Fig. 5. At the front and rear ends of the shaft, respectively, two members 69 and 70 are permanently secured on which upwardly extending handles 71 and 72 are mounted. The handles 71 and 72 are fixed at their lower ends to grooved pulleys 73 and 74, respectively, which are mounted on studs 75 and 76 permitting the handles and attached pulleys to turn about horizontal axes. An endless cable 77 passes around the pulleys 73 and 74, whereby the handles 71 and 72 move in unison. Two studs 78 pass loosely through arc-shaped slots 79 and 80 cut at opposite points in a disk 81 which is rotatably mounted on a bracket 82 attached to the member 15 at a point between the rear bracket 68 and the bearings 66 for the shaft 52, and suitable cable connections 77ª are disposed between the pulleys 74 and the disk 81 to turn said disk whenever the pulley 74 is turned and in the same direction. Members 83 and 84 connect with the studs 78 from which members upper and lower cables 85 and 86 lead to the rear, as shown in Fig. 5, having operative connection, as will later be described, with the various clutch disconnecting members associated with the different clutches on collars 32, 35, 44, 46, 60, and 63.

Adjacent the handles 71 and 72 and secured in any suitable manner to the side of the fuselage, are two arc-shaped sectors 87 and 88 each having a central recess 89 into which the handles 71 and 72 are shown seated, and also front and rear recesses 90 in which the handles may seat when moved to proper position. It will be noted that in the normal central position of the handles 71 and 72, the studs 78 are located in the rear ends of the slots 79 and 80. If either lever 71 or 72 is moved to the forward notch 90 by an aviator, it has no effect on the cable 86, but a pull will be exerted on the cable 85, while if lever 71 or 72 is moved to the rear notch 90, no effect is produced with respect to the upper cable 85, but a pull is exerted on the lower cable 86.

Figure 3:
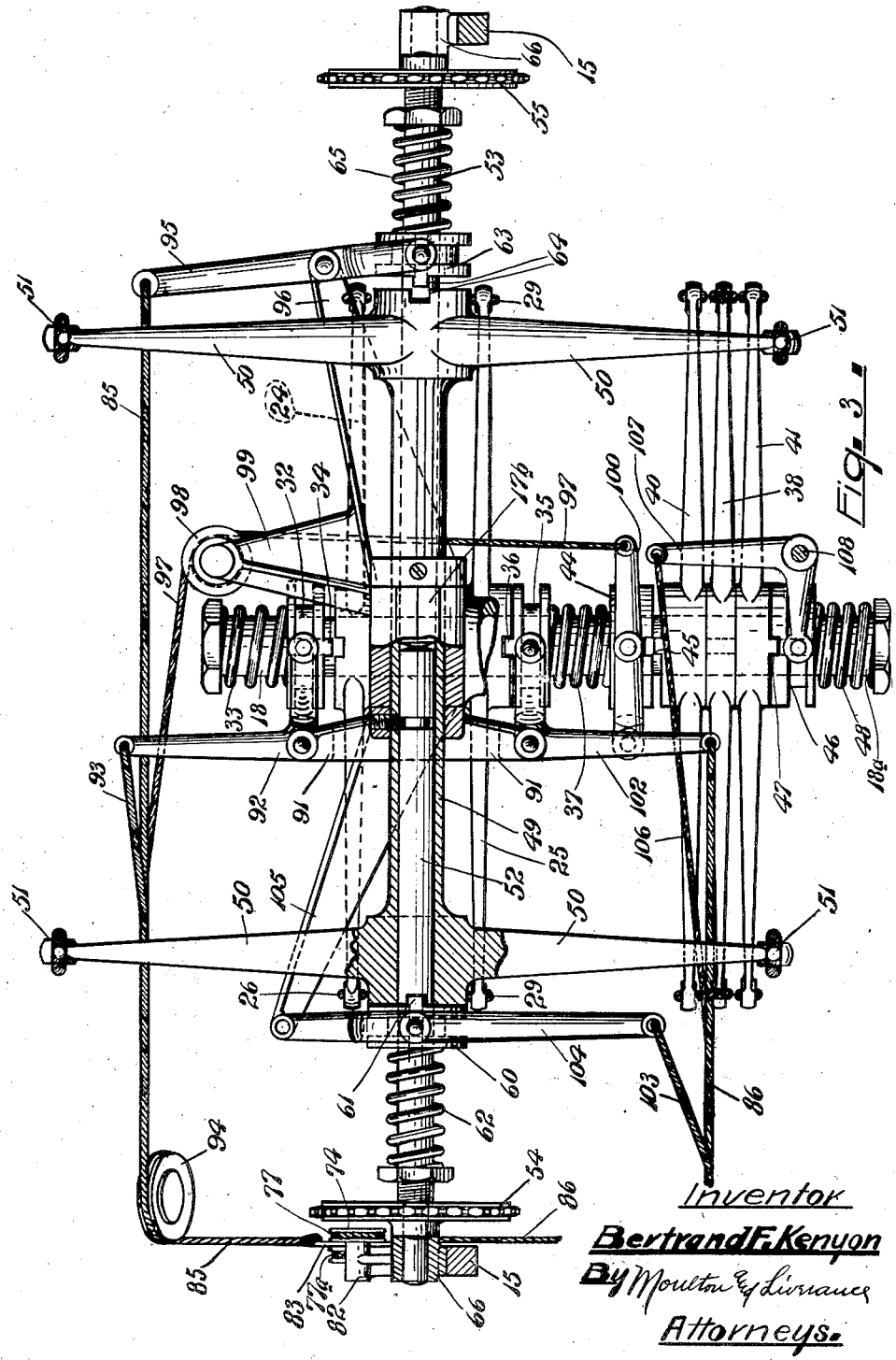
Fig. 3 is a rear elevation, with parts broken away and shown in section, of one of the main units of the controlling mechanism.
Figure 4:
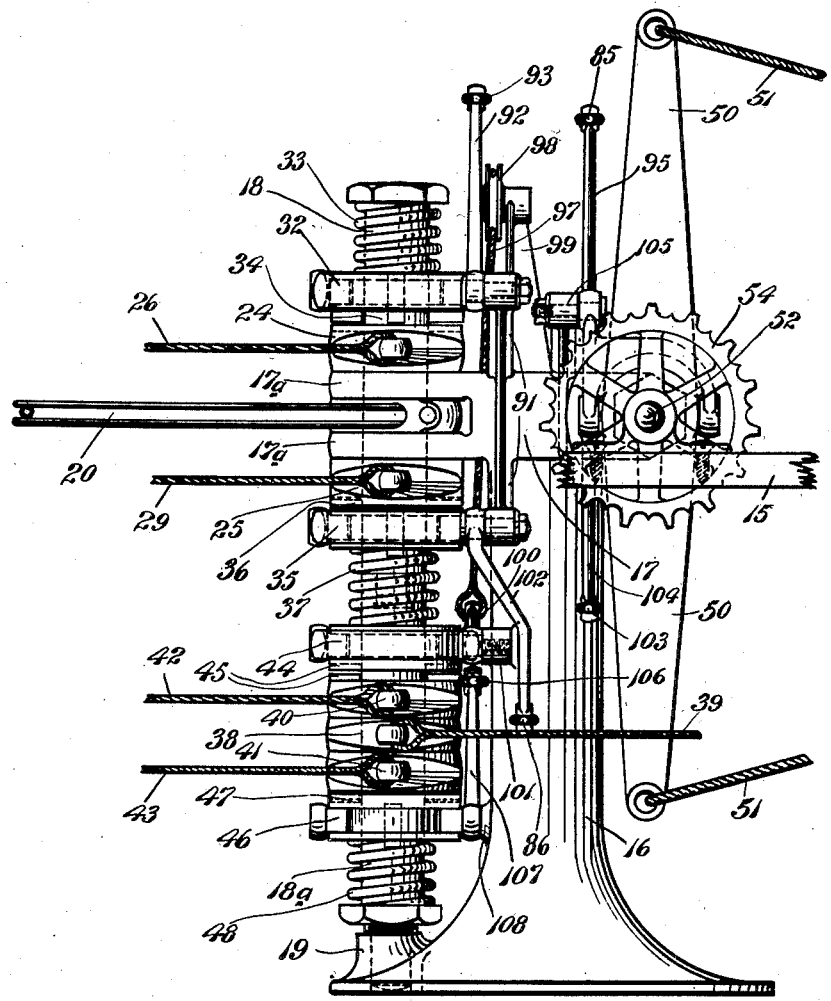
Fig. 4 is a side elevation thereof from the left hand side of Fig. 3.

From the head 17 upper and lower supporting arms 91 extend, to the upper one of which a bell crank lever 92 is pivotally mounted and associated with the collar 32 through a suitable yoke connection, a cable 93 leading from the end of one arm of the bell crank lever, as shown in Fig. 3, to connect with the cable 85 which is guided around a suitable idle pulley 94 mounted on the fuselage. This cable 85 extends to and connects with the upper end of a lever 95 pivotally mounted between its ends on an arm 96 which extends from the head 17. The lower end of the arm 96 is formed with a suitable yoke to engage the collar 63. Another cable 97 connects to the cable 85 passing around an idle pulley 98 mounted on the end of a supporting arm 99 on the head 17, and thence leading to and connecting with the end of a lever 100 which is associated by any suitable yoke connection with the collar 44 and pivotally mounted at its opposite end at 101 on the post 16. It is evident that any pull imparted to the cable 85 and, as a consequence, to the branch cables 93 and 97 therefrom, disconnects the clutches 34, 45, and 64, whereby the lever 24, the lever 40, and the shaft 53 may be moved thereafter without in any way effecting the flight governing devices of the aeroplane such as the ailerons, rudder, or elevators; and inasmuch as the lever 24 is operated by turning the front hand wheel 11, the lever 40 by operating the front foot member 13, and the shaft 53 by turning the front U-shaped controlling element about its pivotal axis, it is clear that when either handle 71 is turned to forward position in the forward notch 90, to pull on the cable 85, the front aviator thereafter has no control of said flight governing devices.

A second bell crank lever 102 is pivotally mounted on the lower depending bracket 91, it having suitable yoke connection with the collar 35, while the cable 86 is guided to and connects with the free end of the lever 102. A branch cable 103 leads to and connects with the lower end of a lever 104 which is pivotally mounted at its upper end on an outwardly extending arm 105 connected with the head 17, this lever 104 having connection to the collar 60. In addition, a second branch cable 106 connects to the cable 86 at one end and at its other end is attached to a bell crank lever 107, pivotally mounted at 108 on the post 16, and having a suitable yoke connection with the collar 46. It is evident in this connection that any pull exerted on the cable 86 disconnects lever 25, lever 41 and shaft 52 from any operation of the aileron, rudders or elevators of the aeroplane, and that if either hand lever 71 or 72 is turned to the rear notch 90, the rear aviator in the aeroplane can thereafter have no control of the flight governing devices of the machine until the hand levers are moved back to the central notch 89, whereupon the various springs associated with the collars disconnected by pulling on cable 86 bring said rear controlling mechanism again into connection with the aileron, rudders and elevators.

Normally handles 71 and 72 are retained in notches 89 or 90 by a yielding spring. Either aviator may grasp one of the handles 71 or 72 and pull the same toward him to disconnect it from its sector 87 or 88 and thereafter move the same either in a forward or rearward direction. In this way the front aviator by grasping handle 71 and moving the same to the front notch 90, may cut himself out from control of the machine, or by moving it to the rear notch, may cut the rear aviator out. The same operation may be effected by the rear aviator to cut either himself or the front aviator out of control. Normally, in flying one aviator will control the flying of the machine and if he is not injured, the other aviator will have nothing to do with the flight of the machine, but may act as observer, if desired, or perform any other duties that a second man in an aeroplane may perform in warfare. If, however, the aviator in control should become injured, the second man may at once disconnect him from flying control of the plane and assume the control thereof himself, and it will make no difference what position the injured man may take with respect to the controlling mechanism which he has operated, any position which they may be forced to due to his death or injury and his falling against them having no effect so far as flying control of the machine is concerned. This construction is also of utility in teaching beginners to fly, the instructor being enabled at any time to cut out the pupil if he should become frightened and lose his head and "freeze" on to the apparatus which he manipulates. For a beginner, however, it is well to modify the extent that the levers 71 or 72 which he may operate can be drawn; that is, he should not be permitted the possibility of disconnecting the instructor, and this can be readily attained by limiting the turn of the handle, such as 71, so that it can turn only between its vertical and forward positions as will be obvious.

The construction described is practical and efficient and shows a complete and operative construction for attaining the double control desired. Various modifications in structural detail may be resorted to without departing from the invention and I, accordingly, do not wish to be limited other than as necessitated by the terms of the claims defining the invention.

I claim:

1. In an aeroplane, a horizontally rotatably mounted sleeve, an upper and lower arm extending from each end of the sleeve, cables leading from the ends of the arms adapted to operatively connect with the aeroplane elevators, a shaft inserted in each end of the sleeve, a spring actuated clutch member splined on each shaft at each end of the sleeve adapted to connect with the sleeve, two inverted U-shaped frames located one in front of said sleeve, means for independently pivotally mounting each frame at the lower ends thereof, a sprocket wheel on each shaft, a sprocket wheel on each frame, means connecting the wheel on each frame with one of the shafts to turn the shaft on pivotal movement of its associated frame, and means to disconnect either of said clutch members from the sleeve, substantially as described.

2. In an aeroplane, a vertically mounted shaft, a member fixed to and extending horizontally therefrom, a cable attached to said member and extending outwardly at each side therefrom, and adapted to connect with the ailerons of the aeroplane, two levers loosely mounted between their ends on the shaft, means for detachably connecting each lever with the shaft, two movably mounted controlling members, cables connecting each controlling member with each end of one of the levers, said controlling members having connection with different levers, and means to disconnect either lever from the shaft.

3. In an aeroplane, a member mounted for rotation about a vertical axis, a cable connected to the member and extending in both directions therefrom adapted to operatively connect with the ailerons of the aeroplane, two rotatably mounted shafts, a pulley and hand wheel on each shaft, two levers operatively associated with said member and pivotally mounted between their ends, cables wound around the pulleys and having their ends connected with the ends of the levers, each pulley being connected with a different lever, and means to disconnect either lever from operative association with said member, substantially as described.

In testimony whereof I affix my signature.

BERTRAND F. KENYON.